(No Model.)
E. LIVERMORE.
FRUIT JAR.
No. 269,074. Patented Dec. 12, 1882.
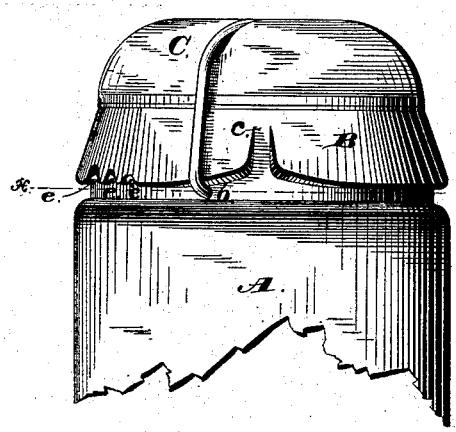
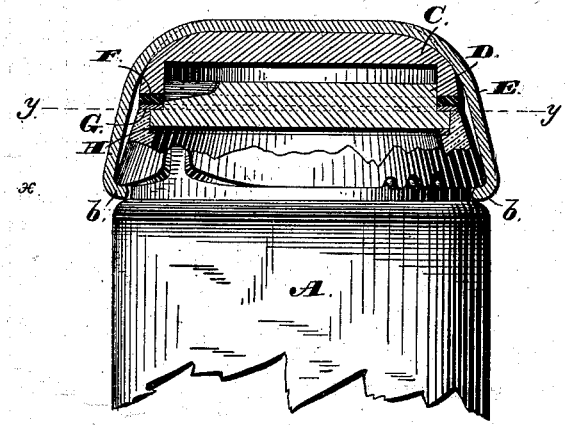
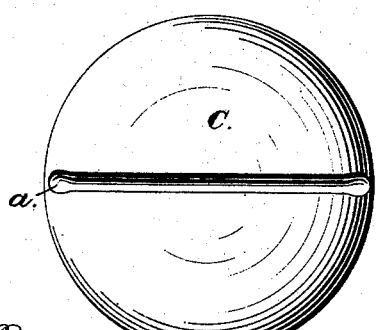
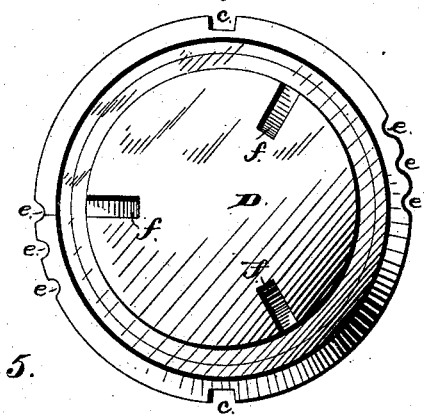
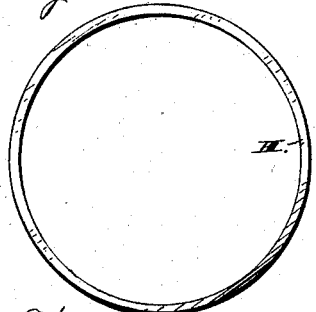
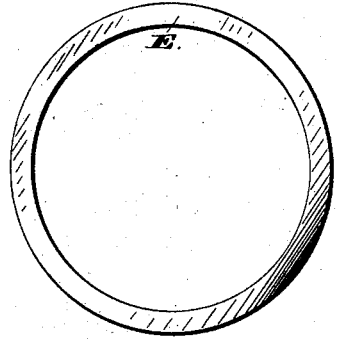
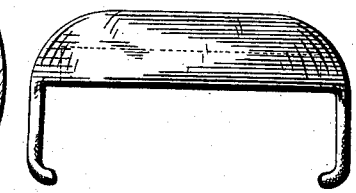
Witnesses:
Jas. E. Hutchinson.
Hattie E. Moore
Inventor.
Edward Livermore
per O. E. Duff
Atty.

UNITED STATES PATENT OFFICE.

EDWARD LIVERMORE, OF NEW YORK, N. Y., ASSIGNOR TO HORACE GALPEN, OF SAME PLACE.

FRUIT-JAR.

SPECIFICATION forming part of Letters Patent No. 269,074, dated December 12, 1882.

Application filed August 9, 1882. (No model.)

*To all whom it may concern:*

Be it known that I, EDWARD LIVERMORE, of New York, in the county of New York and State of New York, have invented certain new and useful Improvements in Fruit-Jars and other Vessels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to fruit-jars and covers therefor, and to means of fastening the same in such manner that the fastening may be adjusted to the thickness of the packing interposed between the sealing-surfaces.

The object of the invention is the preservation of fruits and other substances in air-tight jars or bottles in such manner as to prevent the contact of the fruit or other substance contained in the jars with the sealing-packing, which is generally made of rubber or other flexible material.

Having thus described the nature of my invention, I will now describe the drawings hereto annexed, which show the means of carrying the same into practice.

Figure 1 represents a front elevation of a fruit jar or bottle, showing my fastening embedded in a groove in the stopper or cover. It also shows the double inclines or bevels, each running from the central groove or entering slot. Fig. 2 shows a vertical cross-section on the line *x x* through the mouth and cover of a fruit or other jar. Fig. 3 shows a top or plan view of the cover of the jar detached; Fig. 4, a plan of the inside cover, D, of the jar, provided with indentations for the purpose of turning or loosening said lid when stuck tight to the mouth of the jar. This figure also shows an inverted view of the annular fastening-groove formed around the neck of the jar. Fig. 5 shows a plan of the packing. Fig. 6 shows a plan of an inner packing; and Fig. 7 shows a modification of the cover or top of the jar, which may be made of metal or any suitable material.

A is the jar. B is the neck thereof. C is the cover or stopper. D is the inner cover, and E the bail or locking-bar. F is the rubber or other flexible packing, and C the tin-foil or other taintless packing interposed between the rubber packing and the joint to be packed; H, a tin-foil packing located in an annular recess formed on the inside of the jar.

*a* is a groove formed in and across the cover of the jar, the object being to prevent the locking-bar E from slipping off. The ends *b* of the locking-bar are turned inwardly to engage in the annular recess around the neck of the jar.

*c* are vertical grooves formed on the neck of the jar for the reception of the locking device or keeper when being put on.

*d d* are inclines on the neck of the jar, whereby turning the locking device in either direction secures the cover in position. It is obvious that by turning the keeper more or less it will be made more or less tight or loose.

*e e e* are notches on the edge of the recess, varying in depth for the purpose of adjusting the keeper should it vary in length or should the packing be unequal in thickness, and, furthermore, for more securely locking the jars against danger of leakage.

*f f f* are indentations in the top of the under or inner cover or stopper of the jar, their object being to loosen said stopper when tight, or when it is stuck, simply by inserting a small instrument or lever, then turning the lever, thus loosening the stopper for removal.

The parts forming the stopper are put together in the following manner: On the inside of the mouth or neck of the jar I make an annular shoulder, which forms a seat. On this I locate a packing-piece, H, made of tin-foil or other tasteless or harmless flexible material. On top of this packing H, in the same recess, I locate an inner cover or stopper, D. This cover has an annular shoulder formed on it, which is made to be flush with the top or edge of the jar, which may be seen at line *y y*, Fig. 2. The portion projecting above the seat is made to fit the outer cover, as will presently be described. On this double face *e e*, formed by the edge of the jar and the shoulder of the stopper, I locate another strip of packing, G, made of "tin-foil" or similar material, and on top of this the elastic packing F, of rubber or other flexible material. I then put on the outer top, whose inner circumference fits the outer circumference of the inner top, and whose edge rests upon the rubber packing. I then put on the locking device or keeper, taking care that the ends or hooks $b$ be inserted through the slots $c$. The cover and locking device are then turned, the locking portion engaging the inclines, as far as necessary to tighten the top and compress it against the packing, thus effectually and hermetically sealing the jar in such manner as not only to prevent air from coming in contact with the contents, but also preventing the contents from coming in contact with the rubber packing, as hereinbefore explained.

I provide an air-space between the two lids for the better protection of the contents of the jar or bottle from the uneven temperature of the atmosphere, the air being a good non-conductor.

Should it be desired to fill the jar so full that no empty space is left within, then the jar should be filled to the recess within the mouth of the jar; then let in the inner top or cover in such manner as to force any surplus out the mouth of the jar; then put on the outer packing—tin-foil first, then the rubber, and then the outer cover or top, when it becomes perfectly tight.

I am aware that it is not new to use elastic packing of rubber for sealing jars against air. I am also aware that metal locking devices have been used with inclines on the edge of the annular recess on the jar, and that grooves and shoulders have been made on the necks of jars and on lids or covers, none of which I claim separately; but What I do claim, and desire to secure by Letters Patent, is—

1. The combination, with a fruit-jar provided on the inner side of the mouth with an annular shoulder, of inner packing, H, the inner cover, D, also having a shoulder flush with the edge of the mouth of the jar, and packing of duplex material with cover C, substantially as described.

2. The combination, with a jar, of an inner cover provided with a shoulder and an upwardly-projecting rim, the shoulder being flush with the edge of the jar, duplex packing of different material, and an outer cover adapted to fit the rim of the inner cover, the said covers being secured to the neck of the jar or bottle, all combined and arranged as described.

3. The combination, with a jar, of the inner rimmed cover, means for supporting its shoulder flush with the edge of the jar, a duplex annular packing arranged to fit over said shoulder and the edge of the jar, and an outer cover adapted to fit the packing, and having across its top a groove to hold the fastening device, substantially as described.

4. The combination, with a jar, of the inner cover, the outer cover, a packing interposed between said covers, and overlapping the edge of the jar, and the shoulder of the inner cover, as described.

5. The combination, with a jar, of an inner cover resting within the mouth of the jar, an outer cover, a packing arranged between the covers, and a packing under the inner cover, and having an air-space between them, and a fastening device for compressing the packing and holding the covers to the jar, substantially as set forth and described.

In testimony that I claim the foregoing as my own I affix my signature in presence of two witnesses.

EDWARD LIVERMORE.

Witnesses:
   AUGUSTUS DAVIS,
   M. P. CALLAN.